United States Patent [19]

Swirhun et al.

[11] Patent Number: 5,625,480

[45] Date of Patent: Apr. 29, 1997

[54] CONTROL CIRCUITS FOR PARALLEL OPTICAL INTERCONNECTS

[76] Inventors: Stanley E. Swirhun, 1471 Cassin Ct., Boulder, Colo. 80303; Iain R. Mactaggart, 8579 Darnel Rd. South, Eden Prairie, Minn. 55347

[21] Appl. No.: 653,156

[22] Filed: May 24, 1996

Related U.S. Application Data

[63] Continuation of Ser. No. 302,313, Sep. 29, 1994, Pat. No. 5,521,736.
[51] Int. Cl.$^6$ .................................................. H04B 10/00
[52] U.S. Cl. ............................................. 359/158; 359/189
[58] Field of Search .................................... 359/158, 154, 359/163, 135, 189; 375/317, 318, 319

[56] References Cited

U.S. PATENT DOCUMENTS 5,007,070  4/1991  Chao et al. ........................ 359/158
5,386,311  1/1995  Shields ............................... 359/158
5,444,561  8/1995  Kaminishi .......................... 359/158

Primary Examiner—Wellington Chin
Assistant Examiner—Kinfe-Michael Negash

[57] ABSTRACT

Simple and efficient electronic circuits and methods are disclosed for better use of parallel optical interconnect system transmitting a plurality of dc NRZ data and an independent clock signal. The present invention dynamically compensates for the effects of the substrate temperature and aging behavior of the light emitters at both the transmitter and the receiver. In addition, a special arrangement of light emitters is used to reduce or avoid skew problems.

1 Claim, 7 Drawing Sheets

CONTROL CIRCUITS FOR PARALLEL OPTICAL INTERCONNECTS

This is a continuation of application Ser. No. 08/302,313, filed Sep. 29, 1994 now U.S. Pat. No. 5,521,736.

FIELD OF THE INVENTION

This invention relates to parallel optical interconnects and, more particularly, to a control circuit for parallel optical interconnects.

BACKGROUND OF THE INVENTION

Unlike a conventional single laser (serial) transmission link which transmits signals in series, a parallel optical interconnect system transmits signals in parallel. In operation, data signals in parallel form are input to signal processing and laser drive circuits at a transmitter. The circuits then control laser optical radiation emissions of the data signals. At a receiver, the optical signals are transformed back to electrical data signals via photo detectors and signal processing circuits. For the parallel optical interconnect system of the invention, a plurality of integrally formed vertical cavity surface emitting lasers (VCSELs) are used for signal transmission from the transmitter.

Despite its success in achieving higher data transmission speed compared to conventional single or serial transmission link, a parallel optical interconnect system with VCSELs inevitably encounters problems in performance control and reliability, some of which arise from the nature of parallel signal processing.

One major problem stems from VCSEL performance. The output optical power of the VCSELs fluctuates due to changing environment such as temperature variation, aging behavior of the VCSELs, or circuit property drift in the laser drive circuitry. In the conventional single or serial transmission link, the data output from the laser is coded to be dc balanced. The dc balancing technique allows one to place a photodetector monitor at one face of the laser that is not coupled into the optical fiber. The photodetector receives a proportional fraction of the laser light that is emitted from the laser, and delivers a feedback signal to the laser drive circuit to correct the laser output optical power fluctuation. However, this method is inefficient and troublesome for a parallel optical interconnect system. It would require a photodetector and a feedback circuit for each and every one of the VCSELs. In addition, the dc balance technique is incompatible with the use of uncoded dc signals as in present parallel optical interconnect systems.

Recently, the inventor has developed a new method in which the monitoring photodetector is integrated into VCSELs so as to provide for adjustment of a laser output optical power in a parallel optical interconnect system., see U.S. patent application Ser. No. 08/217,531, which is incorporated herein in its entirety by reference. However, there still remains a significant need for a method and apparatus to monitor and automatically compensate for the laser output optical power fluctuation, in order to reliably utilize the parallel optical interconnect system.

Furthermore, the laser output optical power fluctuation at the transmitter affects the data signal retrieval at the receiver. Thus, there also exists a need to properly retrieve data signals despite any signal fluctuation.

Another kind of problem comes from the nature of parallel processing. Unlike a conventional single (serial) transmission link which typically uses ac coupled receivers, each having a clock recovery circuit, a parallel optical interconnect system has skew, i.e., the signals on a set of parallel interconnects do not all arrive at the receiver simultaneously. The clock signal is transmitted on a separate line in parallel with the data. Skew may be caused by the same factors that lead to output optical power fluctuation of a VCSEL. For example, since the signals being transmitted in the parallel optical interconnect system are uncoded and not dc balanced, some VCSELs transmit more high level (1 level) signals than others during transmission. This almost ensures that these VCSELs have higher temperatures during operation. The temperature difference may be quite significant from one end of the VCSEL array to the other. This laser substrate temperature difference is just one source of skew problems.

A weak clock signal conceivably is another source of skew in the parallel optical interconnect system. Because the clock signal is transmitted with data and this clock signal is used to extract the data signals, there is likely to be skew if there is uncertainty about the exact location in time of the clock transition.

Since skew may cause serious distortion of data signals during transmission, thus offsetting the advantage of using a parallel system, it is essential for a parallel optical interconnect system to have minimal skew.

SUMMARY OF THE INVENTION

It is therefore an object of the present invention to provide simple and efficient electronic circuits to monitor and automatically compensate at a transmitter and receiver for laser output optical power fluctuation because of substrate temperature variation and aging behavior at the transmitter, and to retrieve a data signal at the receiver of the parallel optical interconnect system.

It is another object of the invention to monitor the output of one of the vertical cavity surface emitting lasers (VCSELs) and use this output to control the outputs of the other VCSELs in the array.

It is yet another object of the invention to reduce or avoid skew in parallel data signal transmission.

The parallel optical interconnect system of the invention comprises an optical transmitter, an optical receiver, and an optical connector formed by optical fibers. The optical transmitter transmits a plurality of dc Non-Return-to-Zero (NRZ) data signals and at least one clock signal via a plurality of optical fibers to the optical receiver.

In one embodiment of the invention, the optical transmitter comprises a plurality of integrally formed vertical cavity surface emitting lasers (VCSELs) and laser drive circuits therefor and a laser drive current regulator for high level laser output power. Each of the laser drive circuits has one signal input terminal and one control terminal. The laser drive current regulator comprises a VCSEL, a laser drive circuit therefor, a photodetector, and a laser drive current compensator circuit.

The VCSEL used in the laser drive current regulator is integrally formed on the same substrate as the other VCSELs using the same processes and is selected to be adjacent to the VCSEL used for the clock signal transmission. The drive current compensator monitors, via the photodetector high level laser output, power fluctuation of its VCSEL and feedbacks control signals to the control terminals of each of the VCSEL drive circuits to automatically compensate for the high level laser power fluctuation.

In another embodiment of the invention, the laser drive current regulator comprises a high level laser drive current monitor, a low level laser drive current monitor, and a laser drive level corrector. Each one of the high level laser drive current monitor and the low level laser drive current monitor comprises a VCSEL, a laser drive circuit therefor, a photodetector, and a drive current detector. The laser drive current regulator monitors both high level and low level laser output power fluctuations and feedbacks to each of the VCSEL drive circuits control signals that automatically compensate for the power fluctuations.

In another embodiment of the invention, the optical receiver responsive to a plurality of dc NRZ data and an independent clock signal comprises a plurality of signal receivers and multi-stage signal amplifiers and a clock signal photocurrent averager.

The clock photocurrent averager retrieves the clock signal and produces a reference current level from the received clock signal. Further, the signal receivers retrieve the data signals using the reference current level. Finally, the retrieved data signals are amplified by the multi-stage signal amplifiers before exiting from the receiver.

Further in accordance with the invention clock skew is reduced or avoided by using a more precisely timed VCSEL for clock signal transmission than for data signals, by using at least two VCSELs for clock signal transmission and by interspersing the clock VCSELs among the data VCSELs.

Other objects and features of the present invention will be apparent from the following derailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENTS

The parallel optical interconnect system of the invention comprises an optical transmitter, an optical receiver, and an optical connector. The first two preferred embodiments are implemented at the transmitter of the parallel optical interconnect system for steady transmission of Non-Return-to-Zero (NRZ) data. The electronic circuits in these embodiments have the capability of not only monitoring vertical cavity surface emitting laser (VCSEL) output optical power fluctuation due to laser substrate temperature variation and laser aging behavior but also automatically compensating for VCSEL output power due to the above-mentioned effects. The third preferred embodiment is implemented at the receiver.

Figure 1:
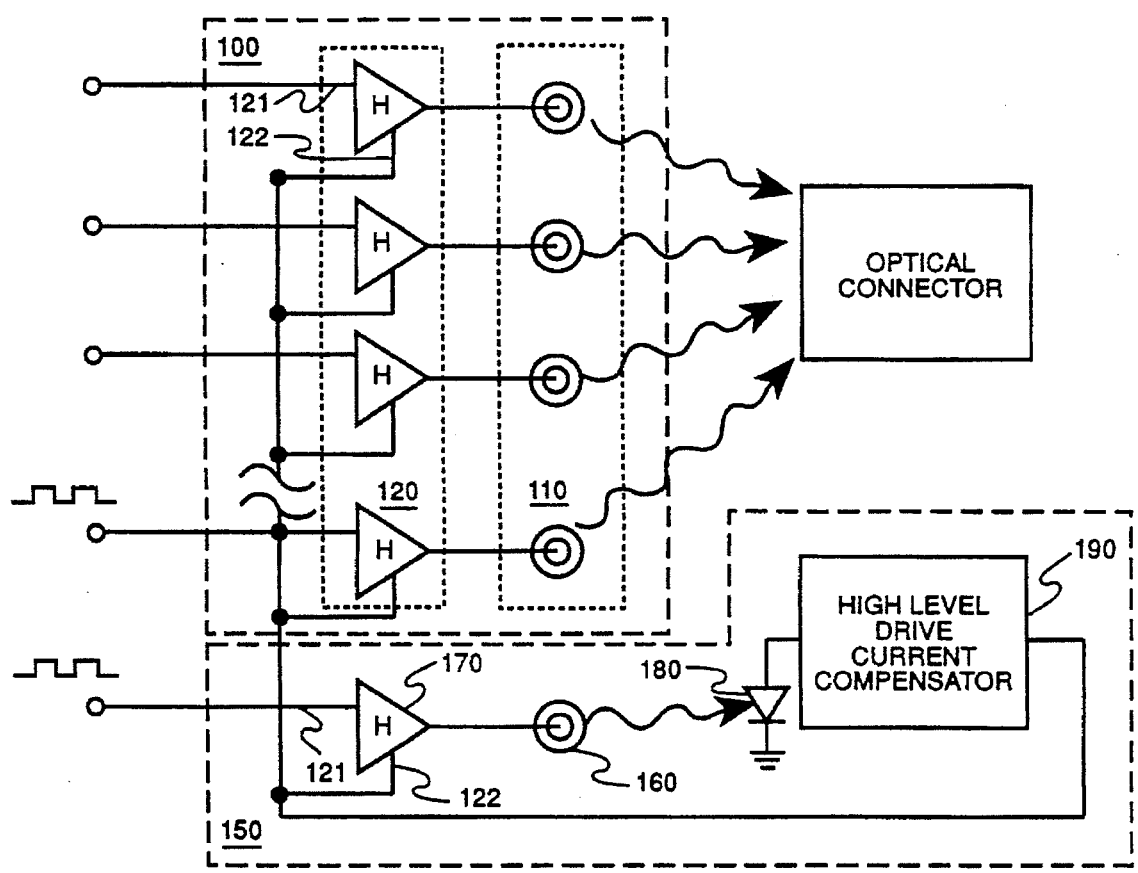
FIG. 1 is a schematic block diagram of an optical transmitter of a first preferred embodiment of the parallel optical interconnect system.

FIG. 1 is a schematic block diagram of a first embodiment of the present invention implemented at the transmitter of the parallel optical interconnect system. In this embodiment it is assumed that low level laser drive current is very close to the lasing threshold so that it does not require compensation and that it is only necessary to compensate for fluctuations in higher level laser output power. The optical transmitter comprises a signal transmission generator 100 and a laser drive current regulator 150 for high level laser output power. The signal transmission generator transmits dc NRZ dam and clock signals via a plurality of optical fibers of the optical connector to an optical receiver (not shown). Signal transmission generator 100 comprises a plurality of integrally formed VCSELs 110, each of which is driven by a laser drive circuit 120. Preferably, laser drive circuits are connected to VCSELs 110 on a one to one basis. Each of the laser drive circuits has a signal input terminal 121 and a control terminal 122. Laser drive current regulator 150 comprises a VCSEL 160, a laser drive circuit 170, a photodetector 180, and a laser drive current compensator 190. Laser 160 is integrally formed on the same substrate as VCSELs 110 by the same processes as used to form VCSELs 110 and is the same size. Laser drive circuit 170 is the same as laser drive circuits 120 and has a signal input terminal 121 and a control terminal 122. Laser drive current compensator 190 has an input terminal 191 and an output terminal 192. The output terminal is connected to control terminal 122 of each of the laser drive circuits, and input terminal 191 is connected to photodetector 180.

Adjacent VCSELs on the same substrate may be fabricated to be identical and may perfectly match each other in terms of L-I and I-V characteristics. Moreover, the adjacent VCSELs experience the same thermal history and have the same substrate temperature variation. Thus, one is able to determine the operational behavior of one VCSEL by monitoring its adjacent VCSEL. Preferably, VCSEL 160 of laser drive current regulator is selected so that it is adjacent to the VCSEL used for the clock signal transmission so that current regulator 150 precisely monitors the operation of the clock signal VCSEL.

In the embodiment of FIG. 1, a 50% duty cycle clock signal is duplicated and used to drive two adjacent VCSELs at the transmitter, one VCSEL 110 being used to transmit the clock signal along with the dc NRZ data into the optical fibers of the optical connector, and the other VCSEL, laser 160, being used to modulate a laser beam in the laser drive current regulator so that it carries an identical clock signal. The beam from laser 160 irradiates photodetector 180 which converts the optical form of the clock signal into an electrical form of the clock signal that is applied to the laser drive current compensator. The current compensator monitors a current corresponding to the high level laser output optical power. If the high level laser output optical power remains above a level sufficient for reliable transmission, the drive current compensator does not interfere. However, when the high level laser output optical power falls below the level necessary for optimal operation due to either a variation in laser substrate temperature or aging behavior of the VCSEL, laser drive current compensator 190 detects current magnitude and provides a feedback to each of the laser drive circuits 120 to automatically compensate for fluctuation in laser output optical power. As a result, the high level laser output power of the dc NRZ data and clock signal is maintained in the optimal operation range, despite any environmental change and/or aging behavior of the lasers. Selection at the transmitter of the optimal power range simplifies the complexity, size and power dissipation of the receiver.

The second embodiment of the invention deals with an automatic adjustment of both high level and low level laser output powers due to laser substrate temperature variation and/or aging behavior of VCSELs. Electronic circuits dynamically determine which laser drive current level must be adjusted in order to keep the VCSELs transmitting signals at the optimal bias point, thus having a low error bit rate for the data.

Figure 2:
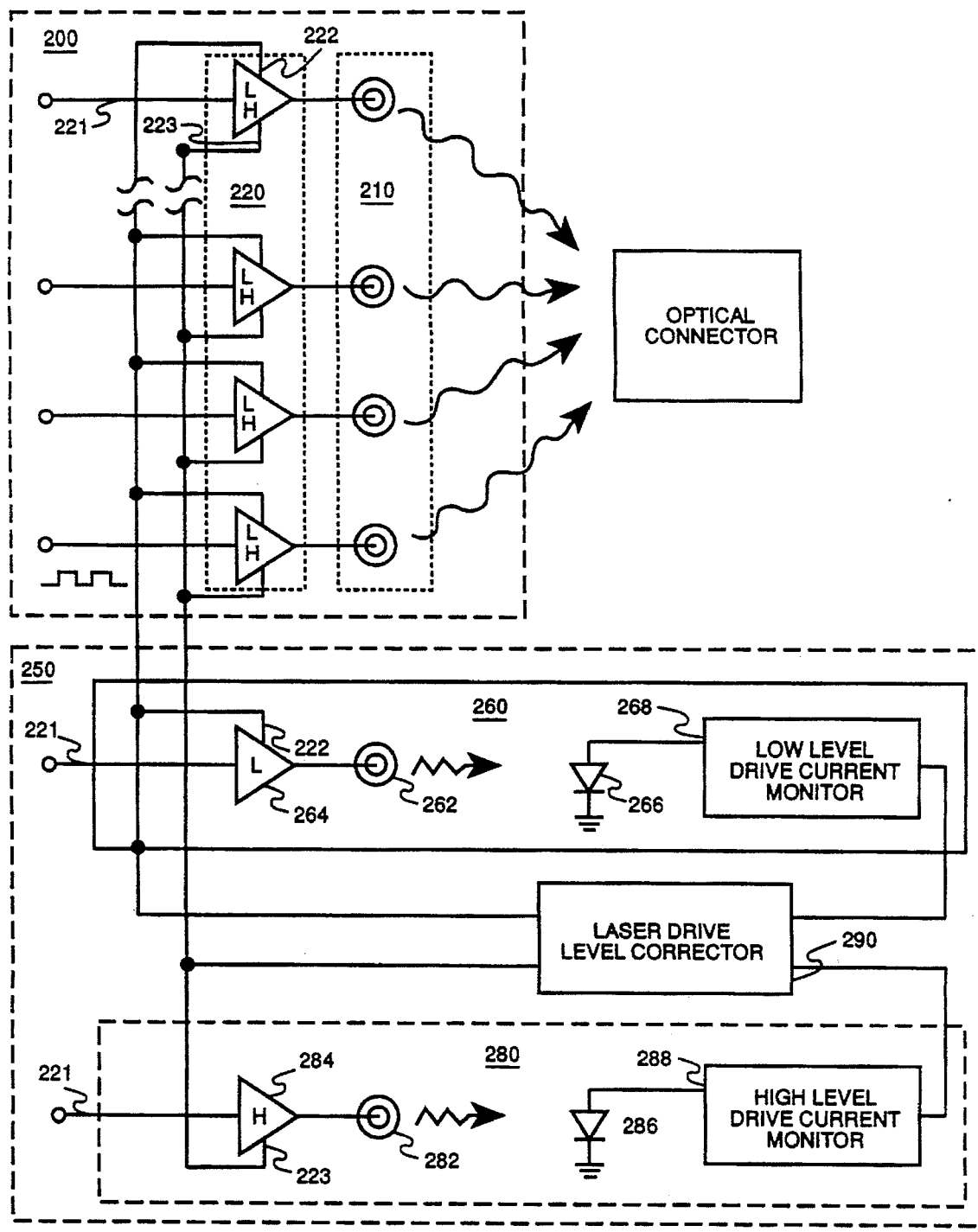
FIG. 2 is a schematic block diagram of an optical transmitter of a second preferred embodiment of the parallel optical interconnect system.

As shown in FIG. 2, an optical transmitter responsive to a plurality of dc NRZ data and an independent clock signal comprises a signal transmission generator 200 and a laser drive current regulator 250 for both high level and low level output powers. The signal transmission generator is used for transmitting dc NRZ data and clock signals into a plurality of optical fibers of the optical connector. Signal transmission generator 200 comprises a plurality of integrally formed VCSELs 210, each of which is driven by a laser drive circuit 220. Preferably, laser drive circuits 220 are connected to VCSELs 210 on a one to one basis. Each laser drive circuit 220 has a signal input terminal 221 and two control terminals 222, 223. Control terminal 222 is used to control the low level output of laser drive circuit 220 and control terminal 223 is used to control high level output. Laser drive current regulator 250 comprises a low level laser drive current monitor 260, a high level laser drive current monitor 280, and a laser drive level corrector 290. Each high level laser drive current monitor 280 and low level laser drive current monitor 260 comprise a VCSEL 262, 282, a laser drive circuit 264, 284, a photodetector 266, 286, and a laser drive current detector 268, 288, respectively. Laser drive circuit 264 has a signal input terminal 221 and a low level control terminal 222 and laser drive circuit 284 has a signal input terminal 221 and a high level control terminal 223.

The laser drive level corrector has two input terminals and two output terminals. The input terminals are connected to the laser drive current detectors of the high level and low level laser drive current monitors, respectively; and the output terminals are connected to the high level and low level control terminals of each of the laser driving circuits.

Lasers 262 and 282 are integrally formed on the same substrate as lasers 210 by the same processes as used to form lasers 210 and they are the same size. Preferably lasers 262 and 282 are selected so that they are adjacent and thermally coupled to the VCSEL used for the clock signal transmission such that they experience the same thermal history and have the same aging behavior.

In the embodiment of FIG. 2, a 50% duty cycle clock signal is copied and delivered to three adjacent VCSELs at the transmitter. The first VCSEL is used to transmit the clock signal along with dc NRZ data into the optical fibers; the second VCSEL is used in the high level laser drive current monitor, and is continuously driven by high level (i.e., 1 level) clock signals; and the third VCSEL is used in the low level laser drive current monitor, and is continuously driven by low level (i.e., 0 level) clock signals.

The monitoring and automatic compensation for the high level laser output power fluctuation is similar to that in the first embodiment. In the low level laser output power monitoring and automatic adjustment, the laser beam from VCSEL 262 irradiates photodetector 266 which generates a current signal corresponding to the clock low signal. This current signal is applied to low level drive current monitor 260.

Laser drive level corrector 290 continuously examines the current magnitudes of both high level and low level clock signal and dynamically determines which laser drive current level must be adjusted to keep the VCSELs 210 transmitting signals at an optimal bias point. As a result, the high level laser output powers of dc NRZ data and clock signals are maintained in the optimal operation range, while the low level laser output powers remains at the lasing threshold level. This embodiment enables the operation of the optical transmitter to avoid the effects of any environmental change and/or aging behavior of the lasers, thus having low error bit rate for the dam.

Figure 3:
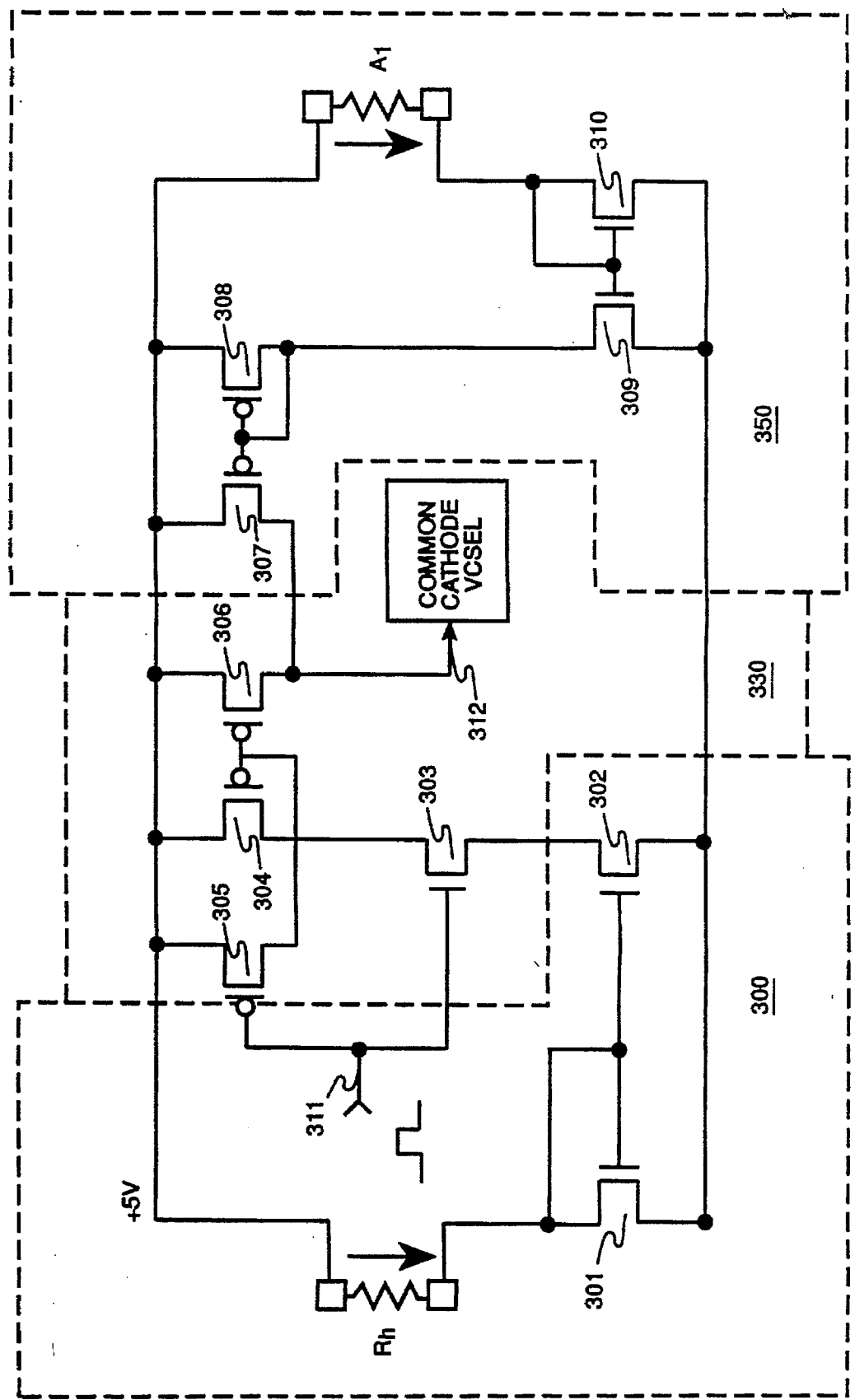
FIG. 3 is a preferred circuit configuration of a common cathode VCSEL drive circuit used in the optical transmitters of the above embodiments.

FIG. 3 delineates a preferred circuit configuration of a common cathode VCSEL drive circuit used in the optical transmitters of the first and second embodiments. The VCSEL drive circuit comprises a high level laser current supplier 300, a low level laser current supplier 350, and an input-output control circuit 330. The signal to be transmitted is provided to the drive circuit of FIG. 3 at node 311 and is provided to the VCSEL at output terminal 312. The circuit further comprises four current mirrors: transistors 301, 302; transistors 304, 306; transistors 307, 308; and transistors 309, 310. In the preferred embodiment, both transistors 301 and 302 have an amplification constant of 60; both transistors 304 and 307 have an amplification constant of 240; transistor 306 has an amplification constant of 480; transistor 308 has an amplification constant of 120; and both transistors 309 and 310 have an amplification constant of 24.

The operating principle of the VCSEL drive circuit is as follows. When the input signal at node 311 is low, transistor 303 is open, i.e., non-conducting or off, and transistor 305 is closed, i.e., conducting or on, in input-output control circuit 330. As a result, no current from the high level laser current supplier may flow beyond transistor 303. In low level laser current supplier 350, an external resistor $R_1$ supplies a current $I_1$ to an on-chip mirror circuit formed of transistors 310 and 309. The current It is further mirrored to the output terminal 312 to the common cathode VCSEL via another mirror circuit formed of transistors 307 and 308. Therefore, a laser drive current having a magnitude of $2I_1$ is output to the VCSEL for the low level signal transmission. Here, the factor two comes from amplification constant ratio product of the mirror circuit 310 and 309 and the mirror circuit 307 and 308, respectively.

When the input signal at node 311 is high, transistor 303 in input-output control circuit 330 is closed. In laser high level current supplier 300, an external resistor $R_H$ supplies a current $I_h$ to an on-chip mirror circuit formed of transistors 301 and 302. The current $I_h$ goes through transistor 303, and is further mirrored to the output terminal to the common cathode VCSEL via another mirror circuit formed of transistors 304 and 306. The current becomes $2I_h$ when it reaches output terminal 312 to the VCSEL. The factor two is obtained by the similar reason as explained above. In the meantime, the current, $2I_1$, from low level laser current supplier 350 still supplies the VCSEL. Therefore, a laser drive current corresponding to the high input signal with a magnitude equal to the sum of $2I_h$ and $2I_1$ is output to the VCSEL for high level signal transmission.

The third embodiment of the invention is directed to a method and apparatus for establishing a dynamic threshold to properly retrieve the dc coupled NRZ data at the receiver regardless of transmitting attenuation.

Figure 4:
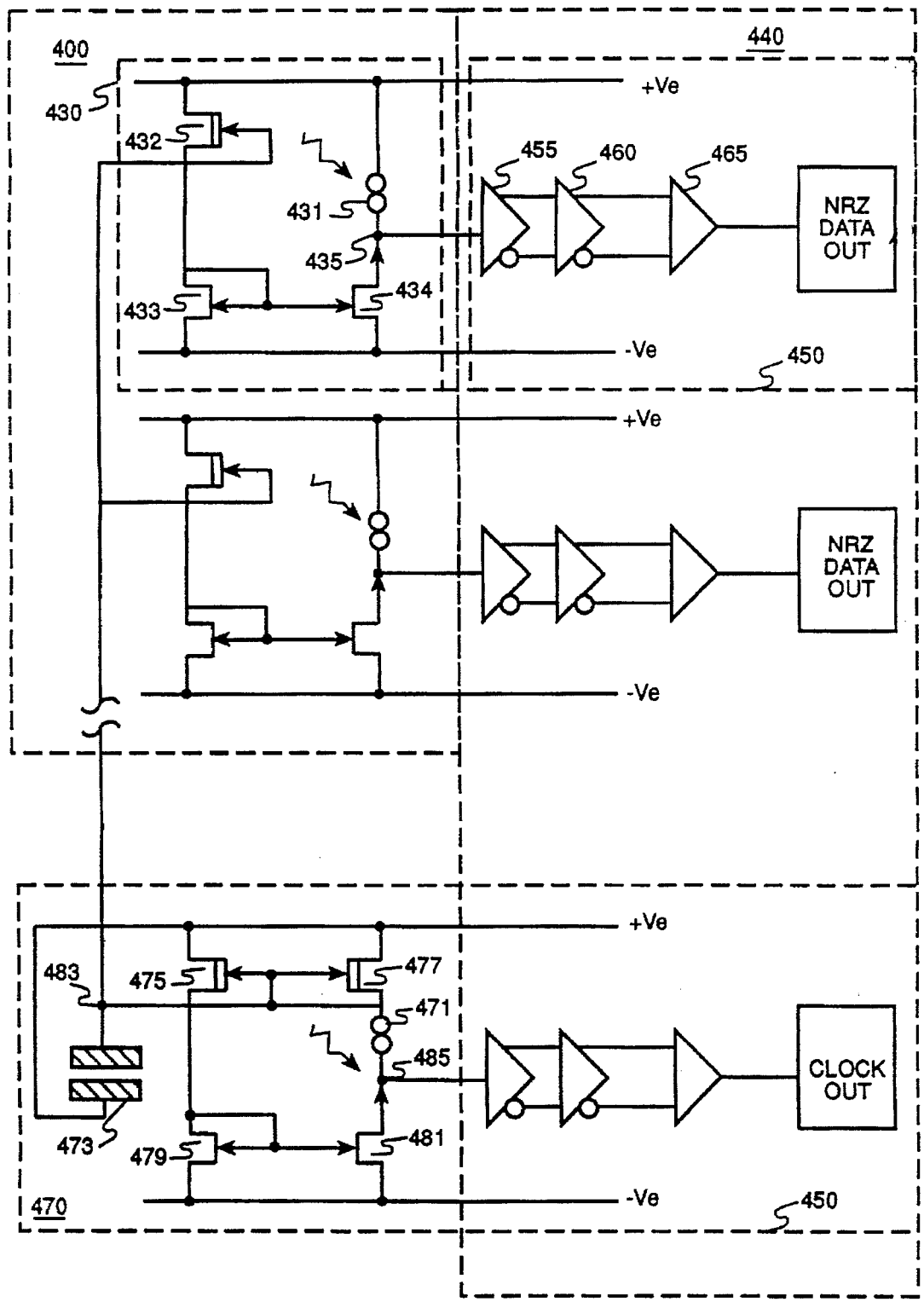
FIG. 4 is a schematic block diagram of an optical receiver of a third preferred embodiment of the parallel optical interconnect system.

Referring to FIG. 4, an optical receiver responsive to a plurality of dc NRZ data and an independent clock signal comprises a signal receiver 400, a multi-stage signal amplifier 440 and a clock photocurrent averager 470. The signal receiver comprises a plurality of channel signal receivers 430, illustratively one for each fiber of the optical connector; and the amplifier comprises a like number of channel amplifiers 450.

Each of the channel signal receivers 430 identically comprises a photodetector 431, a P-type Metal-Oxide-Semiconductor transistor (PMOS) 432, and a N-type Field-Effect-Transistor (NFET) mirror circuit formed by transistors 433 and 434.

Each of multi-stage channel signal amplifiers 450 identically comprises a trans-impedance amplifier 455, a post amplifier/limiter 460 and a CMOS output amplifier 465. The three amplifiers are connected to each other in series in the same order as listed. The trans-impedance amplifier is connected to a node between photodetector 431 and one of the NFET mirror circuit transistors in each of the signal receivers as shown in FIG. 4.

Clock photocurrent averager 470 is used to retrieve the clock signal and produce a current reference level. It comprises a photodetector 471, a capacitor 473, and two mirror circuits: a PMOS mirror circuit formed by two transistors 475 and 477 and an NFET mirror circuit formed by two transistors 479 and 481. Capacitor 473 is connected between the positive voltage supply and the gates of transistors 475 and 477 of the photocurrent averager 470. An output of photocurrent averager 470 is applied to a channel signal amplifier 450. Another output is applied to the gate of a transistor 432 in each channel signal receiver 430.

The operating principle of the electronic circuit for establishing a dynamic threshold to retrieve the dc NRZ data and clock signal at the receiver is as follows. When photodetector 471 is irradiated by the optical radiation carrying the clock signal, photodetector 471 generates a photocurrent. The clock signal photocurrent is then averaged by capacitor 473. The average photocurrent is mirrored twice through the two mirror circuits of the clock photocurrent averager back to node 485, and used as a reference current level to output the clock signal to the transimpedance amplifier 455 connected at node 485.

In addition, the average clock photocurrent serves as the reference current level for retrieving the dc NRZ data at the receiver of the parallel optical interconnect system. Accordingly, the average clock photocurrent is delivered to transistor 432 of each channel signal receiver, and subsequently is mirrored via the NFET mirror circuit to node 435 at the input to trans-impedance amplifier 455. When the dc NRZ data photocurrent generated by the photodetector is superposed upon the average clock photocurrent, the resultant current is then output to the transimpedance amplifier and the multi-stage amplifier amplifies the data signal.

Figure 5:
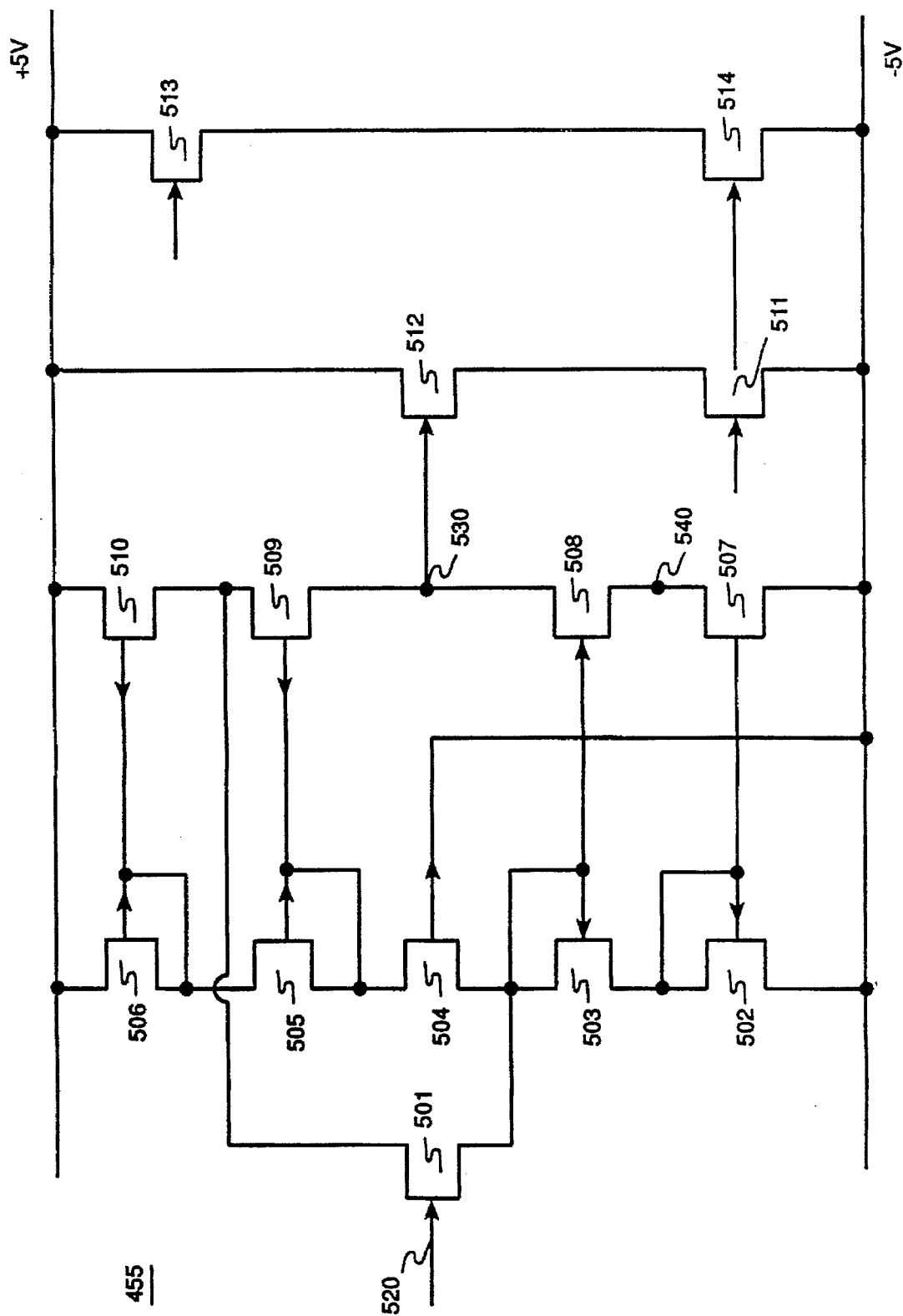
FIG. 5 is a schematic of a high gain transimpedance amplifier for the optical receiver of the embodiment of FIG. 4.

The trans-impedance amplifier depicted in FIG. 4 is used for small signal amplification. A suitable high gain trans-impedance amplifier circuit is depicted in FIG. 5. Transistors 501–509 are Metal-Oxide-Semiconductor-Field-Effect-Transistors (MOSFETS) In addition, the amplifier circuit voltage sources, +5V and −5V respectively, as the power supply. As the current signal carrying dc NRZ data enters input node 520, the trans-impedance amplifier transforms the relatively small current signal to two large voltage signals, and outputs these signals to the next amplifier from output terminals 530 and 540.

In a preferred embodiment of the trans-impedance amplifier, amplification constants for transistors 501 through 508; transistors 509 and 510; and transistors 511 through 514 are 24, 60, and 12, respectively.

Figure 6:
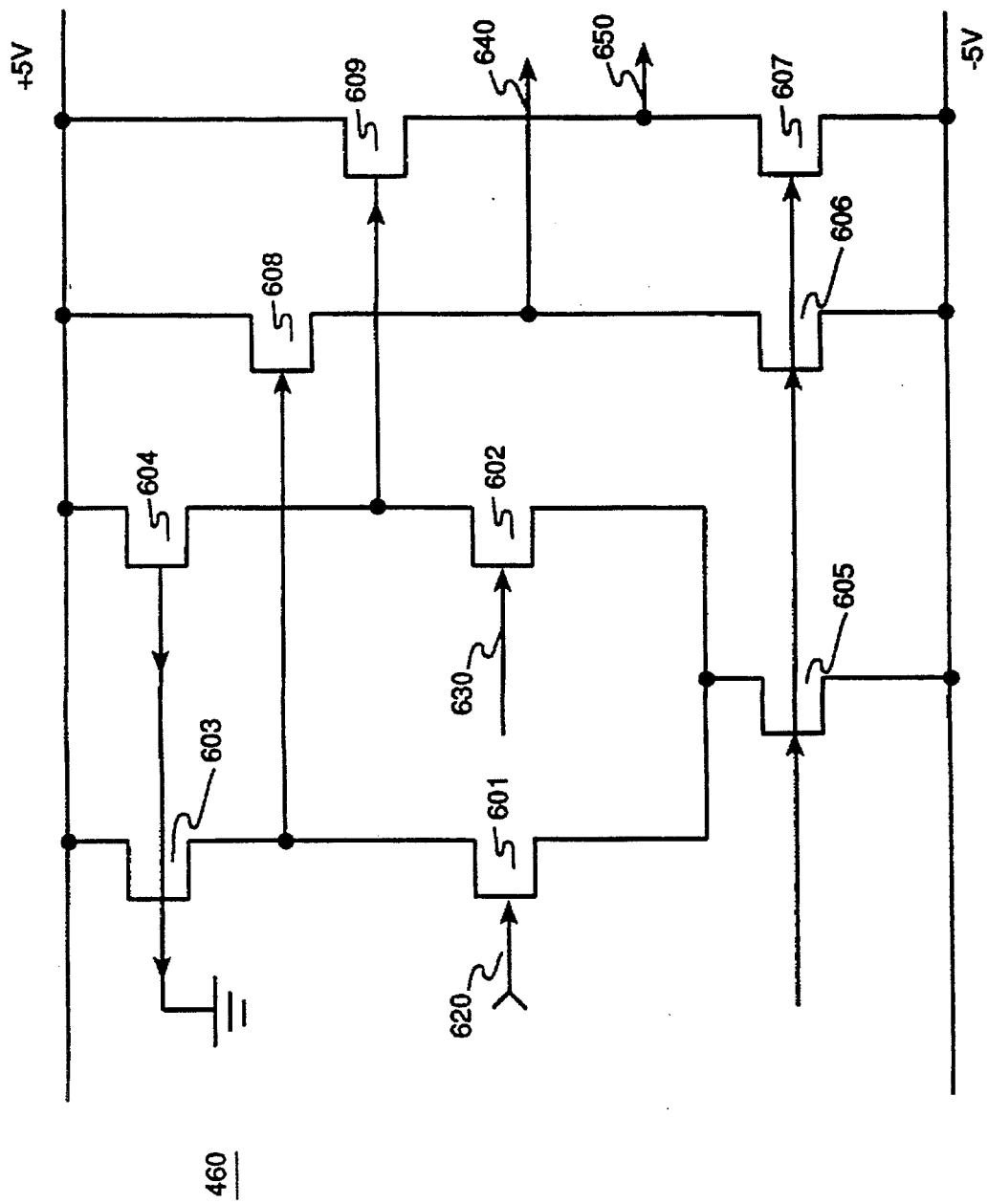
FIG. 6 is a schematic of a post amplifier/limiter for the optical receiver of the embodiment of FIG. 4.

The post amplifier/limiter 460 of FIG. 4 provides an interface between the trans-impedance amplifier 455 and the CMOS output amplifier 465 to prevent any signal surge in amplification. A schematic of the post amplifier/limiter is shown in FIG. 6. The trans-impedance amplifier output terminals 530 and 540 are connected to input terminals 620 and 630 of the post amplifier/limiter. Transistors 601-609 are MOSFET transistors. The circuit needs a pair of voltage supplies, +5V and −5V, as the power supply. Transistor 605 controls circuit bias; and transistors 606 and 607 function as an resistive load for transistors 608 and 609 respectively. The post amplifier/limiter may regulate signals differently according to the operating regime. When it is operated in a linear range, the post amplifier/limiter may function as an amplifier; when it reaches saturation range, the post amplifier/limiter may function as a limiter, only outputting signals with magnitude equal to +5V or −5V. Consequently, output voltage signals from terminals 640 and 650 of the post amplifier/limiter are linearly proportional to the input voltage signals, and final dc NRZ data output will not be affected by any large fluctuation in the previous amplifying stage.

In a preferred embodiment of the post amplifier/limiter, amplification constants for transistors 601 and 602; transistors 603 and 604; transistor 605, and transistors 606 through 609 are 60, 6, 9, and 12, respectively.

Figure 7:
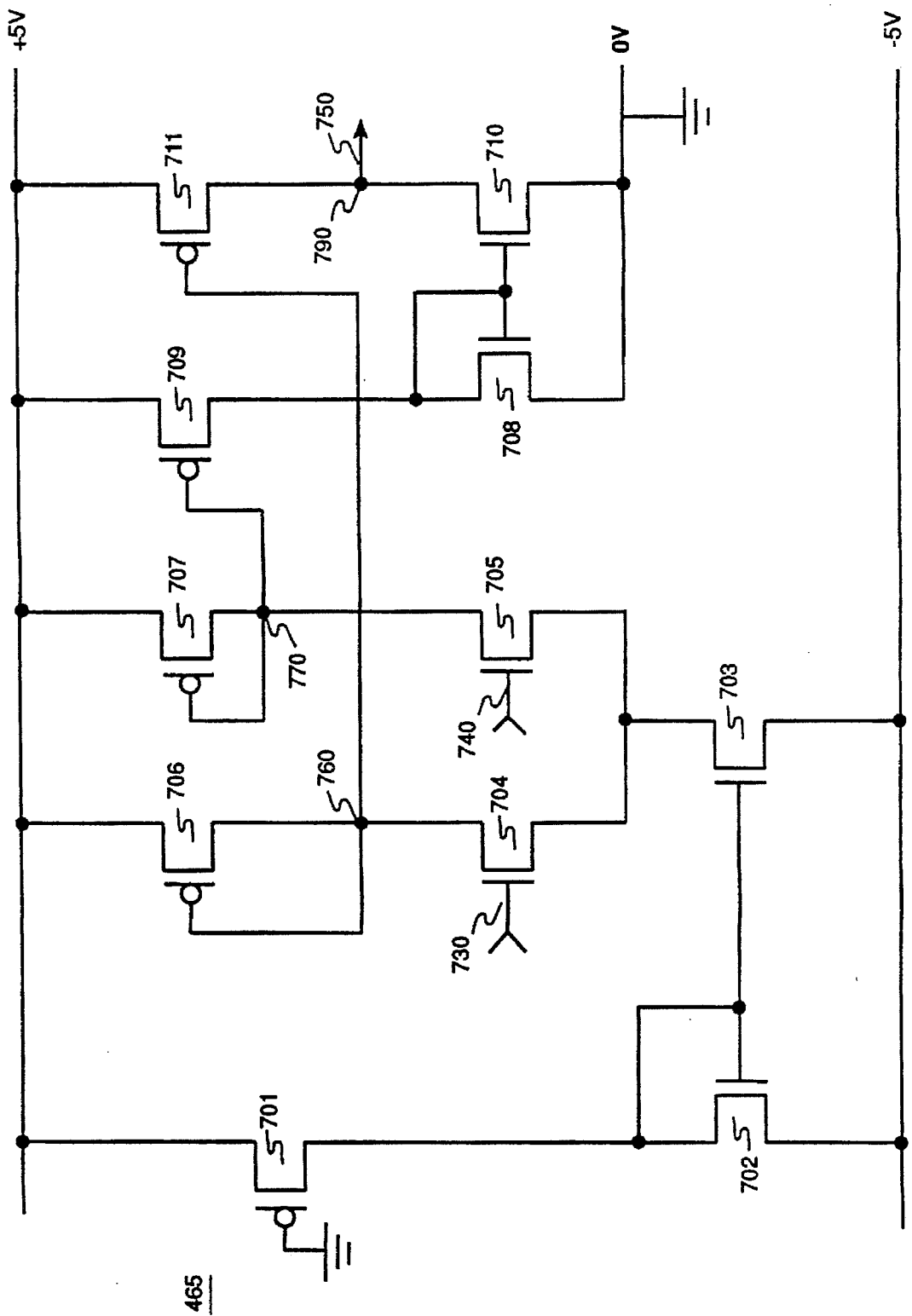
FIG. 7 is a schematic of a CMOS output amplifier for the optical receiver of the embodiment of FIG. 4.

The CMOS output amplifier 465 of FIG. 4 transforms amplified differential voltage signals to an appropriate current signal as the final data output. A schematic of this amplifier is shown in FIG. 7. Transistors 701–711 are MOSFET transistors. Transistors 708 and 710 form a mirror circuit. Transistors 706 and 707 function as an resistive load for transistors 704 and 705 respectively. As the output voltage signals from the post amplifier/limiter are supplied at terminals 730 and 740 of the CMOS output amplifier, transistors 704 and 705 correspondingly generate a voltage signal at nodes 760 and 770 respectively. The voltage signal at node 760 controls transistor 711 and produces a current signal in transistor 711, which current signal is proportional to the voltage signal input at terminal 730. Similarly, the voltage signal at node 770 controls transistor 709 and produces a current signal in transistor 709, which current signal is proportional to the voltage signal input at terminal 740. Further, this current signal is mirrored to node 790 via the mirror circuit of transistors 708 and 710. These two current signals are superposed at node 790 to provide an output on lead 750. As a result, dc NRZ data and clock signals are completely retrieved at the receiver of the parallel optical interconnect with the same characteristics as the original signals.

In the preferred embodiment of the CMOS output amplifier, amplification constants for transistor 701; transistors 702 and 703; transistors 704 and 705; transistors 706 and 707; and transistors 708 through 711 are 6, 9, 60, 12, and 24 respectively.

A further embodiment of the invention is directed at reducing or avoiding skew problems arising from clock signal transmission via a special arrangement of the VCSELs in the parallel optical interconnect system.

One method to reduce or avoid the clock signal skew problem is to use a more precisely timed VCSEL for clock signal transmission than that used for data signal transmission at the transmitter of the parallel optical interconnect system. Since the performance of the whole system depends on the quality of the clock signal, it is advantageous to improve the clock signal transmission by using a more precisely timed VCSEL for clock signal transmission than that for dc NRZ data transmission. Further improvements may be achieved by using a better quality laser drive circuit to drive the clock signal VCSEL in order to minimize noise generation from the drive circuit.

The above-mentioned method may also be used in a multiple format across the parallel VCSEL array at the transmitter to further minimize the clock skew problems. In such case, at least two clock signal VCSELs (and preferably an odd number of VCSELs) are interspersed among a plurality of the data signal VCSELs at the transmitter. Each of the clock signal VCSELs transmits the same clock signal. At the receiver, the transmitted clock signals are compared, and a majority vote is performed to determine when the transition between the 1 level and the 0 level of the clock signal should be chosen for data signal retrieval. The use of the multiple clock signal VCSELs avoids the error which may occur in the use of only one clock signal VCSEL, thus further minimizing clock skew problems. An additional advantage of this redundancy method is that failure of one clock signal VCSEL does not paralyze the normal operation of the parallel optical interconnect system.

The use of multiple clock signal VCSELs also provides a means for monitoring local temperature across the VCSEL array on the substrate. Since they are located at different sections of the VCSEL array, the clock signal VCSELs have different transmissions characteristics depending on their local temperatures provided they are identically fabricated. Thus, by monitoring the transmitted clock signals from the clock signal VCSELs embedded in the data signal VCSEL array, this method allows a true and continuous temperature measure across the VCSEL array on the substrate.

It is understood that various other modifications will be readily apparent to those skilled in the art without departing from the scope and spirit of the invention. In particular, it is emphasized that the inventive approaches are valid independently of the type of light emitter used. Besides VCSELs, the approaches are valid also for light emitting diodes (LEDs), surface-emitting light emitting diodes (SLEDs), resonant-cavity enhanced LEDs (RCLEDs) and edge-emitting semiconductor lasers.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A method of retrieving a plurality of data signals and an independent clock signal at a receiver, said plurality of data signals and said clock signal being transmitted and received at said receiver as optical data signals and an optical clock signal respectively, said method comprising the steps of:

generating a reference current, said step of generating a reference current further comprising the steps of:
  generating a clock photocurrent corresponding to said received optical clock signal; and
  averaging said clock photocurrent to produce said reference current; and retrieving said plurality of data signals and said clock signal from said received optical data signals and said received optical clock signal with reference to said reference current.

\* \* \* \* \*